(12) United States Patent
Hecker et al.

(10) Patent No.: US 7,715,730 B2
(45) Date of Patent: May 11, 2010

(54) METHOD FOR OPTICAL TRANSMISSION OF A POLARIZATION DIVISION MULTIPLEXED SIGNAL

(75) Inventors: Nancy Hecker, Stamberg (DE); Dirk van den Borne, BN Bladel (NL)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 781 days.

(21) Appl. No.: 10/588,023

(22) PCT Filed: Jan. 27, 2005

(86) PCT No.: PCT/EP2005/050353

§ 371 (c)(1),
(2), (4) Date: Aug. 1, 2006

(87) PCT Pub. No.: WO2005/076509

PCT Pub. Date: Aug. 18, 2005

(65) Prior Publication Data

US 2007/0166046 A1    Jul. 19, 2007

(30) Foreign Application Priority Data

Feb. 5, 2004  (DE) .................. 10 2004 005 718

(51) Int. Cl.
*H04B 10/04* (2006.01)
(52) U.S. Cl. .................. 398/184; 398/65; 398/152; 398/195; 398/183; 385/11; 359/246; 359/254; 359/245
(58) Field of Classification Search .............. 398/183, 398/184, 185, 186, 188, 192, 195, 196, 197, 398/198, 79, 65, 152; 385/11, 3, 39; 359/246, 359/254, 245
See application file for complete search history.

(56) References Cited

U.S. PATENT DOCUMENTS 6,104,515 A    8/2000    Cao
6,130,766 A    10/2000   Cao (Continued)

FOREIGN PATENT DOCUMENTS

DE    101 64 497 A1    7/2003

(Continued)

OTHER PUBLICATIONS

Stephan Hinz, David Sandel, Frank Wüst, Reinhold Noé; "Polarization Multiplexed 2x20Gbit/s RZ Transmission using Interference Detection"; Optical Fiber Communication Conference and Exhibit, 2001; pp. WM4-1 to WM4-3; vol. 3, United States.

(Continued)

*Primary Examiner*—Hanh Phan
(74) *Attorney, Agent, or Firm*—Dickinson Wright PLLC

(57)    ABSTRACT

The polarization-multiplexed signal contains two data signals that are orthogonally polarized in relation to one another. Their carrier signals are derived from the same source and thus have the same wavelength. The phase difference between the carrier signals, is adjusted or regulated in such a way that it corresponds to 90°. The phase difference of the carrier signals permits the susceptibility to polarization mode dispersion to be significantly reduced.

5 Claims, 2 Drawing Sheets

U.S. PATENT DOCUMENTS

| | | | |
|---|---|---|---|
| 6,607,313 B1 * | 8/2003 | Farries et al. | 398/102 |
| 7,272,271 B2 * | 9/2007 | Kaplan et al. | 385/3 |
| 2002/0003641 A1 | 1/2002 | Hall et al. | |
| 2002/0093993 A1 | 7/2002 | LaGasse et al. | |
| 2002/0186435 A1 | 12/2002 | Shpantzer et al. | |
| 2003/0184735 A1 | 10/2003 | Kotten et al. | |
| 2004/0208646 A1 * | 10/2004 | Choudhary et al. | 398/188 |

FOREIGN PATENT DOCUMENTS

| | | |
|---|---|---|
| DE | 103 20 658 A1 | 12/2003 |
| EP | 0 507 508 A2 | 10/1992 |
| EP | 1 330 054 A2 | 7/2003 |
| EP | 1 345 347 A2 | 9/2003 |
| EP | 1 376 908 A1 | 1/2004 |
| WO | WO 03/096584 A1 | 11/2003 |

OTHER PUBLICATIONS

Ichiro Seto, Tomoaki Ohtsuki, Hiroyuki Yashima, Iwao Sasase, and Shinsaku Mori; "Polarization State and Phase Noise Insensitive Polsk Phase-Diversity Homodyne System in Coherent Optical Commmunications"; IEEE 1992; Jun. 14, 1992; BNS pp. 1-6.

* cited by examiner

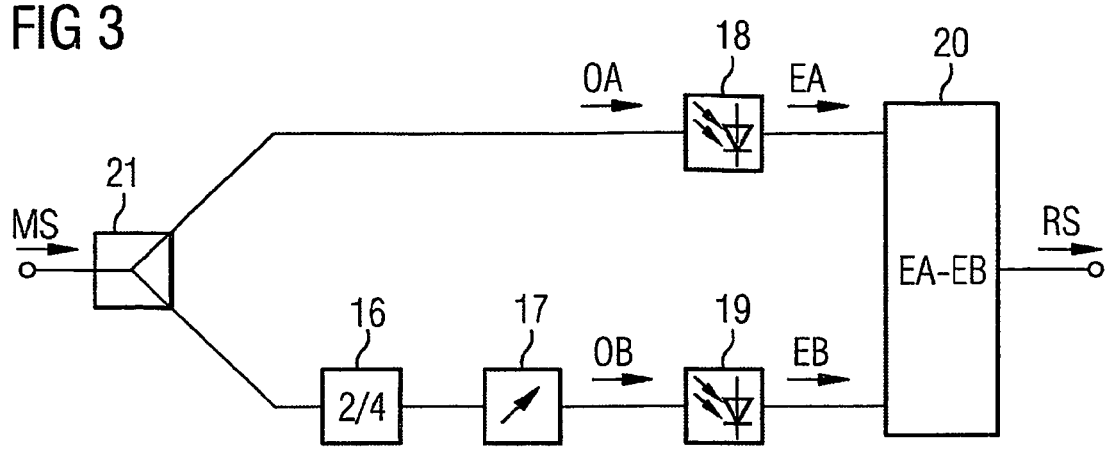
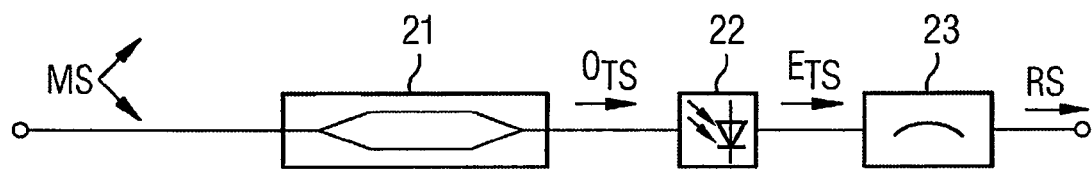
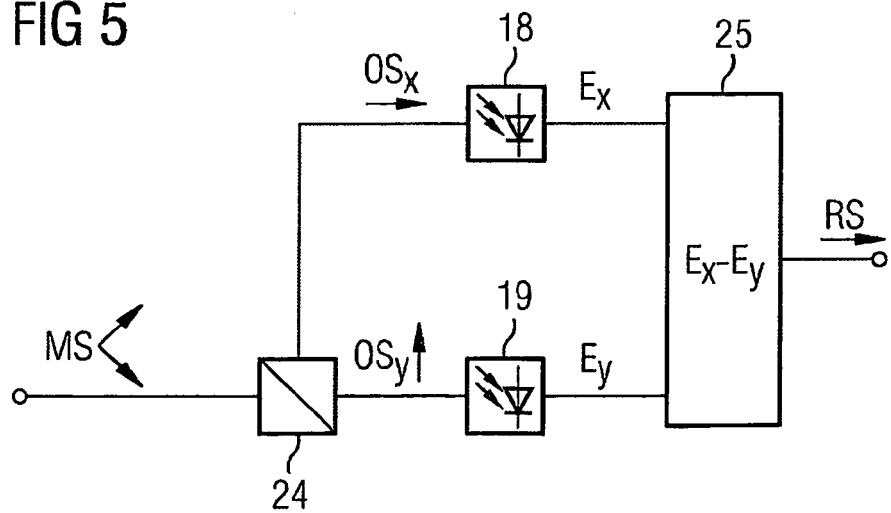

METHOD FOR OPTICAL TRANSMISSION OF A POLARIZATION DIVISION MULTIPLEXED SIGNAL

CROSS REFERENCE TO RELATED APPLICATIONS

This application is the US National Stage of International Application No. PCT/EP2005/050353, filed Jan. 27, 2005 and claims the benefit thereof. The International Application claims the benefits of German application No. 102004005718.4 DE filed Feb. 5, 2004 both of the applications are incorporated by reference herein in their entirety.

FIELD OF INVENTION

The invention relates to an improved method for optical transmission of a polarization division multiplexed signal.

BACKGROUND OF INVENTION

The transmission of data in polarization division multiplex whereby two optical data signals have the same wavelength with orthogonal polarizations is a highly promising method of doubling transmission capacity without having to place more exacting requirements on the transmission link or signal-to-noise-ratio.

However, a disadvantage of polarization division multiplex is susceptibility to polarization mode dispersion (PMD) which results in mutual interference between the transmission channels. Although the effect of PMD can be reduced by PMD compensation measures, compensation is required for each channel of a wavelength division multiplex system; it is also complex/costly and does not always produce the desired results. The use of PMD-optimized fibers likewise provides an improvement, but is only possible for new networks.

SUMMARY OF INVENTION

New possibilities with the object of reducing PMD interference susceptibility and therefore mutual interference of the optical data signals during transmission of a PolMUX signal are therefore required.

This object is achieved by the independent claim.

Advantageous further developments of the method are set forth in the dependent claims.

The method is simple to implement. The carrier signals, derived from the same laser source, of the two optical data signals (PolMUX channels) are mutually phase shifted by a constant 90°. Obviously the two carrier signals therefore also have exactly the same frequency and their phase difference remains constant during transmission. The phase can be adjusted at the transmitter end by different devices such as phase modulators and delay elements.

Also advantageous is the use of a phase control arrangement which ensures a constant phase difference between the carrier signals irrespective of the environmental conditions and component tolerances.

BRIEF DESCRIPTION OF THE DRAWINGS

The invention will now be described in greater detail using examples and with reference to the accompanying drawings in which:

FIG. 3 shows a phase difference measuring arrangement,

FIG. 4 shows another phase difference measuring arrangement and

FIG. 5 shows an arrangement for phase difference measurement by analyzing orthogonal signal components.

DETAILED DESCRIPTION OF INVENTION

Figure 1:
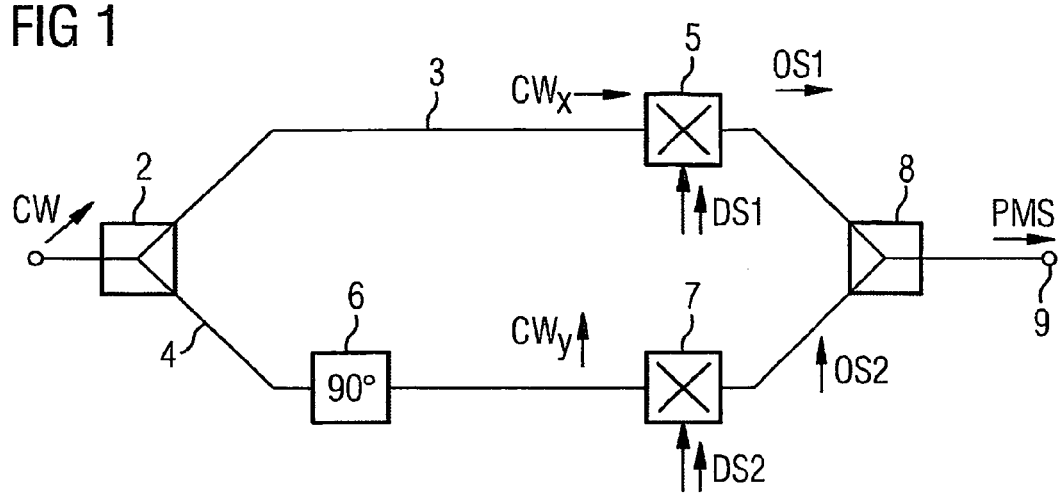
FIG. 1 shows a circuit diagram of the transmit arrangement.

FIG. 1 is a circuit diagram of the transmit arrangement. The method can also be implemented by any desired variants of this arrangement. A constant wave (CW) optical signal normally generated by a laser is fed via an input 1 to a polarization splitter 2 which splits it into two orthogonal carrier signals $CW_X$ and $CW_Y$ of equal amplitude but having planes of polarization differing by 90° (the arrows indicate the relevant polarization). The orthogonal carrier signal $CW_X$ is fed via a first optical fiber 3 to a first modulator 5 where it is intensity modulated with a first data signal DS1. The second orthogonal carrier signal $CW_Y$ is fed via a second fiber 4 and a phase shifter 6 to a second modulator 7 where it is intensity modulated with a second data signal DS2. The optical data signals OS1 and OS2 produced at the outputs of the modulators and which are orthogonally polarized relative to one another and whose carrier signals are phase shifted by 90° are combined in a polarization combiner 8 to form a polarization division multiplex signal (PolMUX signal) PMS and fed out at output 9. Both the phase shift between the two carrier signals and the polarization can likewise be adjusted after the modulators.

Figure 2:
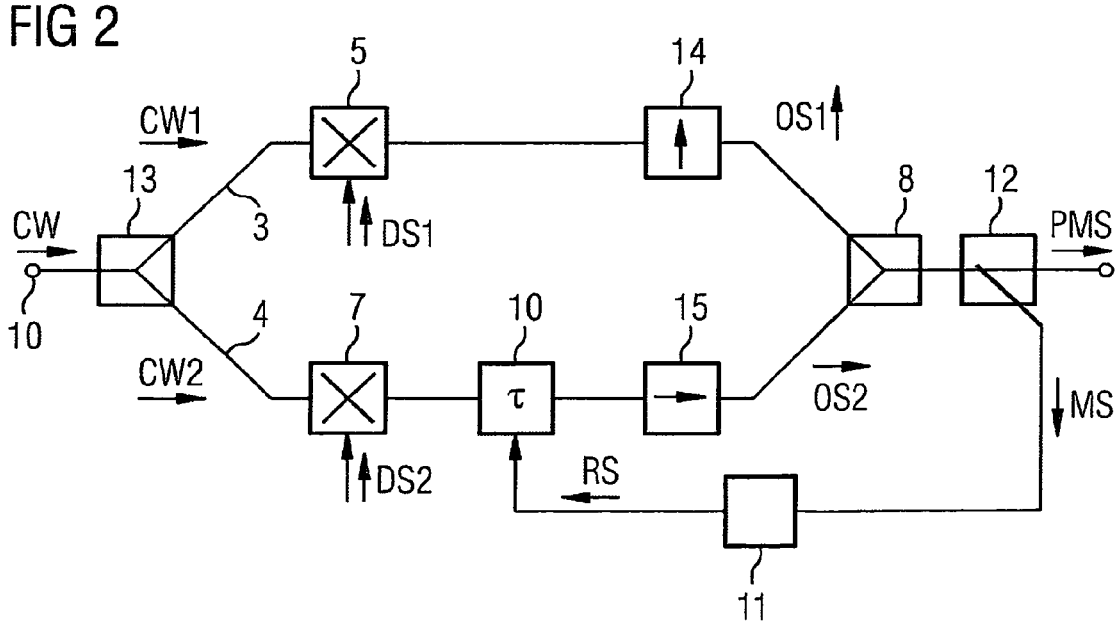
FIG. 2 shows a circuit diagram with phase control.

FIG. 2 shows such a variant in which the carrier signal CW is first split, in a power splitter 13, into two equal components CW1 and CW2 which are modulated as carrier signals with data signals DS1 and DS2 respectively. Conversion into two orthogonal optical data signals OS1 and OS2 is accomplished by two polarization controllers 14 and 15 which are disposed preceding the polarization combiner 8 and naturally also then convert the carrier signals CW1 and CW2 into the orthogonal carrier signals $CW_x$ and $CW_y$.

The phase shift between the carrier signals CW1 and CW2 is created by a controlled phase shifter 10 (phase modulator, delay element) which is controlled by a control device 11. Said control device 11 receives, via a tap 12, a lower-power measurement signal MS corresponding to the PolMUX signal PMS and monitors the phase shift between the carriers of the orthogonal data signals OS1 and OS2. The time constant of the control device is selected very large so that the controlled phase shifter 10 has a virtually constant value. The phase shifter 10 can likewise be connected following the polarization controller 15. The carrier signals can therefore be phase shifted by adjusting the carrier signals $CW_X$ and $CW_Y$ or CW1 and CW2 or the orthogonal data signals OS1 and OS2.

A control criterion for the carrier phases can always be obtained without great complexity if the two PolMUX channels simultaneously transmit a signal, e.g. if the two signals correspond to a logical one.

FIG. 3 shows a circuit diagram of the control device for obtaining a control criterion. The measurement principle is based on the fact that the state of polarization depends on the phase between the two polarized signals OS1 and OS2 and the phase difference can therefore be determined by measuring the state of polarization. It is only necessary to measure the circular polarization component. To measure same, the measurement signal MS, which like the PolMUX signal has a particular polarization, is split into two sub-signals, one of which is fed via a λ/4 plate and a 45° polarizer (polarization filter). At precisely 90° phase displacement of the carrier signals relative to one another the amplitudes of the two sub-signals OA and OB are of equal size. The optical sub-signals OA and OB are converted by photodiodes 18 and 19 into electrical sub-signals EA and EB and fed to a controller 20 which measures the amplitude difference and adjusts the phase difference of the carrier signals accordingly.

FIG. 4 shows another possibility for determining the phase difference by using what is known as a DGD (differential group delay) element such as a polarization-maintaining fiber or birefringent crystal which reverses the 90° phase shift of the carrier signals so that their superimposition produces maximum power (or, in the case of opposite phase displacement, minimum power) in the output signal RS. The polarization planes of the orthogonal signals OS1 and OS2 must be at 45° to the main axes of the DGD element. After conversion of the optical superimposition signal OTS into an electrical superimposition signal ETS in a photodiode 22, the effective power is determined in a control device 23 and adjusted to a maximum (or minimum).

FIG. 5 shows another arrangement for controlling the phase. The requirement is again that the PolMUX signal PMS or rather the corresponding measurement signal MS has a particular polarization, as is the case anyway, however, for the transmitter. The PolMUX signal or rather the measurement signal here has two (at least virtually) orthogonal signals OS1 and OS2 polarized +45° and −45° relative to a polarization plane of the polarization splitter 24. The measurement signal MS representing the two orthogonal signals OS1 and OS2 is decomposed by the polarization splitter 24 into two polarized signal components $OS_X$ and $OS_Y$ which therefore contain signal components of the two orthogonal signals OS1 and OS2. The signal components $MS_x$ and $MS_Y$ are separately converted into electrical signal components $E_X$ and $E_Y$ in photodiodes 18 and 19. Only when there is a particular phase between the orthogonal signals OS1 and OS2 will the two signal components $MS_X$ and $MS_Y$ be of equal magnitude. A corresponding criterion EA-EB can be used for control. The sensitivity of the control system can be increased by special signal processing in the control device 25, e.g. by multiplication of the signal components.

The invention claimed is:

1. A method for optical transmission of a polarization division multiplexed signal having two orthogonal polarized optical data signals whose first carrier signal and second orthogonal carrier signal respectively have the same wavelengths and are modulated by data signals, comprising:

shifting the phase of the first carrier signal and the second carrier orthogonal signal so that the first carrier signal and second orthogonal carrier signal of said two orthogonal polarized optical data signals are phase shifted 90° relative to one another, wherein the phase difference between the carrier signals is controlled, and wherein that to obtain a phase control criterion the circular polarization component of the polarization division multiplexed signal is measured to provide a control signal;

tapping off a measurement signal from the polarization division multiplexed signal; and splitting the tapped measurement signal into two identical signal components, one of which is converted directly into a first electrical sub-signal, the other is first fed via a $\lambda/14$ plate tuned to the wavelength of the carrier signals and a polarization filter and then converted into a second electrical sub-signal, wherein the two signal components are compared with one another to obtain a control signal, and wherein the phase between the carrier signals is varied so that electrical sub-signals have the same values.

2. A method for optical transmission of a polarization division multiplexed signal having two orthogonal polarized optical data signals whose first carrier signal and second orthogonal carrier signal respectively have the same wavelengths and are modulated by data signals, comprising:

shifting the phase of the first carrier signal and the second carrier orthogonal signal so that the first carrier signal and second orthogonal carrier signal of said two orthogonal polarized optical data signals are phase shifted 90° relative to one another, wherein the phase difference between the carrier signals is controlled;

tapping off a measurement signal from the polarization division multiplexed signal to obtain a phase control criterion; and feeding the measurement signal to a DGD element tuned to the wavelength of the carrier signals, wherein an output signal of the DGD element is converted into an electrical signal, whereby a measured and a control signal is obtained, and wherein the phase between the carrier signals is varied so that the output signal of the DGD element attains an extreme value.

3. The method as claimed in claim 2, wherein polarization planes of the orthogonal data signals have an angle of ±45° relative to a main axes of the DGD element.

4. A method for optical transmission of a polarization division multiplexed signal having two orthogonal polarized optical data signals whose first carrier signal and second orthogonal carrier signal respectively have the same wavelengths and are modulated by data signals, comprising:

shifting the phase of the first carrier signal and the second carrier orthogonal signal so that the first carrier signal and second orthogonal carrier signal of said two orthogonal polarized optical data signals are phase shifted 90° relative to one another, wherein the phase difference between the carrier signals is controlled;

tapping off a measurement signal from the polarization division multiplexed signal to obtain a phase control criterion;

splitting the measurement signal into two mutually orthogonal signal components, wherein the orthogonal signal components are converted into electrical signal components and wherein the control signal is obtained from the amplitudes of the electrical signal components.

5. The method as claimed in claim 4, wherein polarization planes of the orthogonal data signals are set ±45° to a polarization plane of a polarization splitter, and wherein the phase between the carrier signal is varied so that the amplitudes of the electrical signal components have identical values.

* * * * *